(12) United States Patent
Sasaki et al.

(10) Patent No.: US 6,670,422 B2
(45) Date of Patent: Dec. 30, 2003

(54) GOLF BALL AND RUBBER COMPOSITION THEREFOR

(75) Inventors: Hiroto Sasaki, Chichibu (JP); Jun Shindo, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 5 days.

(21) Appl. No.: 10/061,271

(22) Filed: Feb. 4, 2002

(65) Prior Publication Data

US 2002/0137852 A1 Sep. 26, 2002

(30) Foreign Application Priority Data

Feb. 9, 2001 (JP) ......................................... 2001-033271

(51) Int. Cl.$^7$ .............................. A63B 37/06; C08L 9/00
(52) U.S. Cl. ........................ 525/193; 525/236; 525/274; 473/371; 473/372; 473/373; 473/377
(58) Field of Search ................................ 525/193, 236, 525/274; 473/371, 372, 373, 377

(56) References Cited

U.S. PATENT DOCUMENTS 4,056,269 A * 11/1977 Pollitt

FOREIGN PATENT DOCUMENTS

| JP | 62-142571 A | 6/1987 |
| JP | 62-176465 A | 8/1987 |
| JP | 63-3878 | 1/1988 |
| JP | 2-185274 A | 7/1990 |
| JP | 6-327791 A | 11/1994 |

* cited by examiner

Primary Examiner—David J. Buttner
(74) Attorney, Agent, or Firm—Sughrue Mion, PLLC

(57) ABSTRACT

A rubber composition comprising 100 parts by weight of a base rubber containing 5–30% by weight of syndiotactic-1, 2-polybutadiene and at least 40% by weight of cis-1,4-polybutadiene, 5–10 parts by weight of an unsaturated carboxylic acid metal salt, up to 2 parts by weight of an inorganic filler, and 10–30% by weight based on the weight of the metal salt of an initiator can be molded and vulcanized into a rubber product having a specific gravity of less than 1 and is suitable for the manufacture of golf balls for practice over water.

8 Claims, No Drawings

GOLF BALL AND RUBBER COMPOSITION THEREFOR

This invention relates to a rubber composition which can be effectively molded into a product to construct a component of a golf ball, and a golf ball comprising a molded and vulcanized product of the rubber composition and having durability and a pleasant feel when hit.

BACKGROUND ART

In rubber compositions for forming golf balls, a metal salt of unsaturated carboxylic acid or a combination of unsaturated carboxylic acid with metal oxide and/or an initiator is often incorporated for hardness adjustment purposes.

In the case of rubber compositions for overwater practice golf balls, atheir hardness is adjusted by compounding syndiotactic-1,2-polybutadiene as a rubber component, incorporating a metal salt of unsaturated carboxylic acid or a combination of unsaturated carboxylic acid with metal oxide therein, and adding an initiator. At the same time, ultrahigh molecular weight polyolefin microparticulates or microballoons are admixed and dispersed in the rubber compositions for achieving a low specific gravity.

Specifically, JP-A 62-142571 and JP-A 2-185274 disclose compositions comprising a base rubber containing certain amounts of syndiotactic-1,2-polybutadiene and cis-1,4-polybutadiene as essential components, in which are compounded a microparticulate high-molecular-weight polyolefin having a specific mean particle diameter or microballoons having a specific pressure resistant strength, a crosslinkable monomer, an inorganic filler, and an initiator.

However, these compositions undergo delamination during long-term service because the microparticulate high-molecular-weight polyolefin or microballoons and the inorganic filler are present uncrosslinked or as foreign matter in the crosslinked rubber. That is, delamination occurs at the interface between the crosslinked rubber and the polyolefin microparticulates, microballoons or inorganic filler, resulting in variations of resilience and hardness and core cracks, which have a serious effect on the durability of the ball.

JP-A 62-142571, JP-A 62-176465, JP-A 63-3878, JP-A 2-185274, and JP-A 6-327791 disclose the blending of syndiotactic-1,2-polybutadiene. There is still left room for improvement in durability, as typified by stable hardness capable of withstanding long-term service, and hitting feel.

SUMMARY OF THE INVENTION

An object of the invention is to provide a golf ball-forming rubber composition which can be effectively molded into a product to construct a component of a golf ball, and a golf ball comprising a molded and vulcanized product of the rubber composition and having durability and a pleasant feel when hit.

It has been found that a rubber composition for golf balls, in which a base rubber containing 5 to 30% by weight of syndiotactic-1,2-polybutadiene and at least 40% by weight of cis-1,4-polybutadiene is blended with a metal salt of an unsaturated carboxylic acid, an inorganic filler, and an initiator such that the rubber composition may be molded and vulcanized into a rubber product having a specific gravity of less than 1, is effective to work, that is, to mold and vulcanize. The molded and vulcanized rubber product is suited to construct a golf ball because the golf ball is endowed with excellent durability and hitting feel. The resulting golf ball is especially suitable as an overwater practice golf ball.

According to the invention, there is provided a rubber composition for golf balls, comprising 100 parts by weight of a base rubber containing 5 to 30% by weight of syndiotactic-1,2-polybutadiene and at least 40% by weight of cis-1,4-polybutadiene, 5 to 10 parts by weight of a metal salt of an unsaturated carboxylic acid, up to 2 parts by weight of an inorganic filler, and 10 to 30% by weight based on the weight of the unsaturated carboxylic acid metal salt of an initiator. The rubber composition can be molded and vulcanized into a rubber product having a specific gravity of less than 1.

In one preferred embodiment, the base rubber has further compounded therein up to 5% by weight of at least one member of liquid butadiene rubber, liquid isoprene rubber and liquid EPDM and/or up to 8% by weight of high-styrene rubber.

In another aspect, the invention provides a golf ball comprising a molded and vulcanized product of the rubber composition as a constituent component. Typically, the golf ball has a core and a cover enclosing the core, or a core, a mantle layer enclosing the core and a cover enclosing the mantle layer, wherein at least one layer of the core, the mantle layer and the cover is comprised of the molded and vulcanized product. The golf ball should preferably have a specific gravity of less than 1.

DESCRIPTION OF THE PREFERRED EMBODIMENT

In the golf ball-forming rubber composition, the base rubber has syndiotactic-1,2-polybutadiene and cis-1,4-polybutadiene compounded as essential components.

According to the invention, syndiotactic-1,2-polybutadiene must be compounded in an amount of at least 5% by weight, preferably at least 10% by weight, and up to 30% by weight based on the weight of the base rubber. Excessive amounts of syndiotactic-1,2-polybutadiene result in too hard vulcanized moldings which can worsen the feel on hit, whereas less amounts result in too soft vulcanized moldings which lead to a decline of durability.

Cis-1,4-polybutadiene must be compounded in an amount of at least 40% by weight, preferably at least 50% by weight, and more preferably at least 60% by weight based on the weight of the base rubber. Less amounts of cis-1,4-polybutadiene can lead to less resilient vulcanized moldings.

In the base rubber, another rubber component may be compounded in addition to the essential components. Such other rubber components include liquid butadiene rubber, liquid isoprene rubber, liquid ethylene-propylene-diene rubber (EPDM), high-styrene rubber, butyl rubber, natural rubber, polyisoprene rubber, and styrene-butadiene rubber. Of these, liquid butadiene rubber, liquid isoprene rubber, liquid EPDM, high-styrene rubber or a mixture thereof is preferably compounded for improving the working efficiency of mixed rubber.

The amount of the other rubber component compounded is not critical. It is recommended to compound the other rubber component in an amount of up to 5%, especially up to 3% by weight of the base rubber when the other rubber component is the liquid butadiene rubber, liquid isoprene rubber or liquid EPDM. When the high-styrene rubber is used, it is preferably compounded in an amount of up to 8%, especially up to 5% by weight of the base rubber. An excessive amount of the other rubber component may render rubber mixing operation inefficient and result in a molded and vulcanized product with less resiliency.

The golf ball-forming rubber composition of the invention is formulated by compounding a metal salt of an unsaturated carboxylic acid, an inorganic filler, and an initiator in the above-mentioned base rubber.

The metal salt of an unsaturated carboxylic acid is to provide the reinforcement effect of increasing the hardness of moldings. Exemplary salts are the zinc and magnesium salts of acrylic acid and methacrylic acid. Use of zinc diacrylate is recommended.

It is recommended to compound the metal salt of unsaturated carboxylic acid in an amount of from 5 parts to 10 parts by weight per 100 parts by weight of the base rubber. Less amounts of the salt lead to vulcanized moldings which are rather soft and less durable whereas too large amounts of the salt lead to vulcanized moldings which are hard and have an increased specific gravity beyond the level for overwater practice golf balls.

Examples of the inorganic filler include zinc oxide, barium sulfate, calcium carbonate and silica. Of these, use of zinc oxide is recommended. The filler is compounded in an amount of up to 2 parts by weight per 100 parts by weight of the base rubber. Excessive amounts of the filler may be present as a foreign matter in the rubber composition and adversely affect the durability and specific gravity of the rubber composition.

Any of well-known initiators may be used herein. Examples include 1,1-bis-t-butylperoxy-3,3,5-trimethylcyclohexane, dicumyl peroxide, di(t-butylperoxy)-meta-diisopropylbenzene, and 2,5-dimethyl-2,5-di-t-butylperoxyhexane. Of these, dicumyl peroxide is most preferred.

The amount of the initiator blended is at least 10%, especially at least 15% by weight and up to 30%, especially up to 25% by weight based on the weight of the unsaturated carboxylic acid metal salt. Too large an amount of the initiator can lead to a hard feel whereas too small an amount can lead to softness and poor durability.

In the golf ball-forming rubber composition of the invention, various additives may be compounded if necessary. An antioxidant is a typical additive.

The golf ball-forming rubber composition of the invention is prepared by mixing the components in a conventional mixer such as a Banbury mixer, kneader or roll mill. The compound thus obtained is compression molded using a suitable mold, for example, under conditions of 140 to 180° C. and 20 to 60 minutes, yielding a molded and vulcanized product. The rubber composition of the invention has the advantage of good workability including ease of kneading, roll sheeting and extrusion.

A molded and vulcanized product of the rubber composition of the invention and a golf ball comprising the same both have a specific gravity of less than 1.0, preferably up to 0.995, and more preferably up to 0.990. If a golf ball comprising a vulcanized molding of the rubber composition has a specific gravity of more than 1, it does not buoy on water and cannot be used as a float ball.

The golf ball of the invention has a molded and vulcanized product of the rubber composition according to the invention as a constituent component. The inventive golf balls encompass various types of golf balls, for example, golf balls comprising a core and a cover enclosing the core, and golf balls comprising a core, a mantle layer enclosing the core, and a cover enclosing the mantle layer. Differently stated, two-piece, three-piece, and multi-piece golf balls are included in which any of the core, one or more mantle layers and the cover is constructed by the molded and vulcanized product of the rubber composition.

In the embodiment wherein the vulcanized molding of the inventive rubber composition is the solid core, the cover may be produced from any of well-known cover materials. The base of such cover material is selected, for example, from ionomer resins, polyester resins, polyester elastomers, styrene elastomers, urethane elastomers, hydrogenated butadiene resins, and mixtures thereof. The method of forming the cover is not critical. A variety of techniques, typically injection molding and compression molding may be employed.

The golf ball of the invention is improved in durability and hitting feel and best suited as an overwater practice golf ball. For practice over water, the ball as a whole should have a specific gravity of less than 1. The preferred embodiment of the ball for practice over water is a two-piece golf ball. Recommended is a golf ball consisting of a solid core in the form of a vulcanized molding of the inventive rubber composition and a cover made of an ionomer resin.

The golf ball of the invention is best suited for practice over water, but not limited thereto. The golf ball of the invention may also be manufactured for use in tournaments by giving it a diameter and weight which conform with the Rules of Golf, that is, a diameter of not less than 42.67 mm and a weight of not greater than 45.93 g.

The golf ball-forming rubber composition of the invention can be effectively molded into a molding or otherwise processed and is a suitable material of which a golf ball having a very good feel and durability is constructed. A golf ball comprising a molded and vulcanized product of the rubber composition is improved in feel and durability.

EXAMPLE

Examples of the invention and comparative examples are given below by way of illustration, and are not intended to limit the invention.

Examples 1–4

Comparative Examples 1–4

Core materials as formulated in Table 1 were prepared and compression molded in a predetermined core mold at 170° C. for 20 minutes, obtaining solid cores having a diameter of 38.5 mm. The core materials were rated for workability by the following test. The results are shown in Table 1.

Ease of Operation or Workability

Various operations were carried out including kneading on a Banbury mixer and a kneader, sheeting on a roll mill and extrusion, overall workability was evaluated according to the following criterion.

◯: no problem

Δ: less effectively workable, but no substantial problem

X: difficult to work

Next, using an ionomer resin as a cover stock, a cover having a gage of 2.1 mm was formed around the cores, yielding two-piece solid golf balls.

The main ingredients used herein and shown in Table 1 are as follows.

1 BROL by JSR, cis-1,4-polybutadiene
2 RB820 by JSR, syndiotactic-1,2-polybutadiene
3 UBEPOL-VCR412 by Ube Industries, Ltd., syndiotactic-1,2-polybutadiene 12% and cis-1,4-polybutadiene 86%
4 R-15HT by Idemitsu Petro-Chemical Co., Ltd., liquid butadiene rubber
5 HSR 0061 by JSR, high-styrene rubber
6 Nipol 2007J by Nippon Zeon Co., Ltd., high-styrene resin
7 Percumyl D by NOF, dicumyl peroxide
8 Miperon XM-220 by Mitsui Chemical Co., Ltd. microparticulate ultrahigh-molecular-weight polyolefin having an average particle diameter of less than 20 μm and an average molecular weight of at least $200 \times 10^6$ 9 Glass Bubbles S60/10000 by Sumitomo 3M Co., Ltd., soda-lime borosilicate glass microballoons having a pressure resistant strength of 703 kg/cm$^3$ and an average particle density of 0.60 g/cm$^3$ 10 Himilan 1855 and 1601 by Dupont Mitsui Polychemical Co., Ltd., ionomer resins, a 1/1 mixture giving the cover a Shore D hardness 58

The golf balls were examined by the following tests. The results are also shown in Table 1.

Feel

A panel of ten amateur golfers hit the ball with a driver (#W1) and gave a rating according to the following criterion. The rating of the most golfers is assigned to the ball.

◯: soft and pleasant feel

Δ: somewhat hard or somewhat soft feel

X: too hard or too soft feel

Durability Against Crack

The ball was repeatedly hit at random positions with a club at a head speed of 40 m/s. The number of hits repeated until the ball failed was counted and converted into a relative durability index based on a durability index of 100 for Example 1. The ball was rated according to the following criterion.

◯: good (durability index 100)

Δ: ordinary (durability index 80–99)

X: poor (durability index ≦79)

What is claimed is:

1. A rubber composition for golf balls, comprising;
   100 parts by weight of a base rubber containing 5 to 30% by weight of syndiotactic-1,2-polybutadiene and at least 40% by weight of cis-1,4-polybutadiene;
   5 to 10 parts by weight of a metal salt of an unsaturated carboxylic acid;
   up to 2 parts by weight of an inorganic filler; and
   10 to 30% by weight based on the weight of the unsaturated carboxylic acid metal salt of an initiator; and
   no fine-particulate polyolefin,
   wherein the rubber composition can be molded and vulcanized into a rubber product having a specific gravity of less than 1.

2. The rubber composition of claim 1 wherein said base rubber has further compounded therein up to 5% by weight of at least one member of liquid butadiene rubber, liquid isoprene rubber and liquid EPDM.

3. The rubber composition of claim 1 wherein said base rubber has further compounded therein up to 8% by weight of high-styrene rubber.

4. A golf ball comprising a molded and vulcanized product of the rubber composition of claim 1.

5. The golf ball of claim 4 comprising a core, a cover enclosing the core, and optionally a mantle layer between the core and the cover,
   at least one layer of said core, said mantle layer and said cover being comprised of the molded and vulcanized product.

TABLE 1

|  |  |  | Specific gravity | Example 1 | Example 2 | Example 3 | Example 4 | Comparative Example 1 | Comparative Example 2 | Comparative Example 3 | Comparative Example 4 |
|---|---|---|---|---|---|---|---|---|---|---|---|
| Core | Base rubber (wt %) | High-cis BR *1 | 0.92 | 90 |  | 78 | 73 | 100 |  | 50 | 35 |
|  |  | Syndiotactic-1,2-polybutadiene *2 | 0.91 | 10 | 10 | 20 | 25 |  | 10 | 50 |  |
|  |  | Cis-1,4-polybutadiene containing syndiotactic-1,2-polybutadiene *3 | 0.91 |  | 90 |  |  |  | 90 |  | 55 |
|  |  | Liquid butadiene rubber *4 | 0.91 |  |  | 2 |  |  |  |  |  |
|  |  | High-styrene rubber *5 | 1.01 |  |  |  | 2 |  |  |  |  |
|  |  | High-styrene resin *6 | 1.05 |  |  |  |  |  |  |  | 10 |
|  | Other components (wt %) | Zinc diacrylate | 1.70 | 8 | 8 | 8 | 8 | 8 | 4.5 | 8 | 30 |
|  |  | Zinc oxide | 5.57 | 1 | 1 | 1 | 1 | 1 | 1 | 1 | 12 |
|  |  | Initiator *7 | 1.02 | 2 | 1.5 | 2 | 1.5 | 2 | 2.5 | 2 | 2 |
|  |  | Microparticulate, high-molecular-weight polyolefin *8 | 0.935 |  |  |  |  |  |  |  | 15 |
|  |  | Microballoons *9 | 0.60 |  |  |  |  |  |  |  | 20 |
|  |  | Content (wt %) of syndiotactic-1,2-polybutadiene in polybutadiene |  | 10.0 | 20.8 | 20.4 | 25.5 | 0.0 | 20.8 | 50.0 | 6.6 |
|  |  | Amount (wt %) of initiator based on unsaturated carboxylic acid metal salt |  | 25.0 | 18.8 | 25.0 | 18.8 | 25.0 | 55.6 | 25.0 | 6.7 |
| Cover | Himilan 1855 *10 |  |  | 50 | 50 | 50 | 50 | 50 | 50 | 50 | 50 |
|  | Himilan 1601 *10 |  |  | 50 | 50 | 50 | 50 | 50 | 50 | 50 | 50 |
| Ball | Ball specific gravity |  |  | 0.98 | 0.97 | 0.97 | 0.98 | 0.98 | 0.98 | 0.98 | 0.98 |
|  | Feel |  |  | ◯ | ◯ | ◯ | ◯ | X | X | X | Δ |
|  | Durability |  |  | ◯ | ◯ | ◯ | ◯ | Δ | Δ | ◯ | X |
|  | Workability |  |  | Δ | Δ | ◯ | ◯ | ◯ | Δ | Δ | Δ |

Note: The amount of other components is parts by weight per 100 parts by weight of the base rubber.

Japanese Patent Application No. 2001-033271 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

6. The golf ball of claim 4 having a specific gravity of less than 1.

7. The rubber composition of claim 1 wherein said unsaturated carboxylic acid metal salt is a zinc salt or acrylic acid.

8. The rubber composition of claim 1 wherein the amount of said inorganic filler is up to 1 part by weight.

* * * * *